US012731105B2

(12) United States Patent
Tirumala et al.

(10) Patent No.: US 12,731,105 B2
(45) Date of Patent: Sep. 8, 2026

(54) COMPUTER VISION AI/ML BASED SYSTEM AND METHODS FOR REAL-TIME SMART INVENTORY MANAGEMENT ON RETAIL SHELVES

(71) Applicant: Aapya Solutions Inc., Lutz, FL (US)

(72) Inventors: Ramesh B. Tirumala, Lutz, FL (US); Tristan de Blegiers, Gainesville, FL (US); Lukasz Masiukiewicz, York, PA (US)

(73) Assignee: Aapya Solutions Inc., Lutz, FL (US)

( * ) Notice: Subject to any disclaimer, the term of this patent is extended or adjusted under 35 U.S.C. 154(b) by 26 days.

(21) Appl. No.: 18/899,277

(22) Filed: Sep. 27, 2024

(65) Prior Publication Data

US 2025/0111331 A1 Apr. 3, 2025

Related U.S. Application Data

(60) Provisional application No. 63/586,069, filed on Sep. 28, 2023.

(51) Int. Cl.
*G06Q 10/087* (2023.01)
*G06V 10/82* (2022.01)
(Continued)

(52) U.S. Cl.
CPC .......... *G06Q 10/087* (2013.01); *G06V 10/82* (2022.01); *G06V 20/50* (2022.01); *G06V 20/70* (2022.01)

(58) Field of Classification Search
CPC ...... G06Q 10/087; G06V 20/70; G06V 10/82; G06V 20/50
See application file for complete search history.

(56) References Cited

U.S. PATENT DOCUMENTS 8,630,924 B2 * 1/2014 Groenevelt .......... G06Q 10/087 283/79
10,565,548 B2 * 2/2020 Skaff .................... G06Q 10/087
(Continued)

OTHER PUBLICATIONS

Verma, Nishchal K., et al. "Object identification for inventory management using convolutional neural network." 2016 IEEE Applied Imagery Pattern Recognition Workshop (AIPR). IEEE, 2016. (Year: 2016).*
(Continued)

*Primary Examiner* — Nathan A Mitchell
(74) *Attorney, Agent, or Firm* — PATENTFILE, LLC; Bradley C. Fach; Steven R. Kick

(57) ABSTRACT

A computer vision AI/ML based system and methods for real-time smart inventory management on retail shelves are provided. In preferred embodiments, the system may be used to address the above problems using computer vision Artificial Intelligence and Machine Learning (AI/ML) along with specific algorithms to identify products, gaps, misplaced products, planogram compliance, out-of-stock (OOS) scenarios and in addition provide the capabilities to automate the process associated with stock audits which help in reducing labor costs. The architecture of the system preferably involves positioning the high-res cameras on shelves monitoring the products 24/7/365 and wirelessly transmitting the images/picture/videos to a computing device, such as an Edge Device, having GPU and CPU capabilities which provides the inference needed for object detection, gap detection, misplaced items and out-of-stock items and preferably communicates that to the cloud where the application and database are hosted.

19 Claims, 1 Drawing Sheet

(51) Int. Cl.
*G06V 20/50* (2022.01)
*G06V 20/70* (2022.01)

(56) References Cited

U.S. PATENT DOCUMENTS

| | | | | |
|---|---|---|---|---|
| 10,949,799 | B2 * | 3/2021 | Chaubard | G06Q 10/087 |
| 12,183,079 | B1 * | 12/2024 | Huang | G06V 20/50 |
| 12,243,004 | B2 * | 3/2025 | Skaff | G06Q 10/087 |
| 2009/0063307 | A1 * | 3/2009 | Groenovelt | G06Q 10/087 705/28 |
| 2017/0178227 | A1 * | 6/2017 | Graham | G06Q 30/0643 |
| 2017/0193434 | A1 * | 7/2017 | Shah | G05D 1/0212 |
| 2018/0001481 | A1 * | 1/2018 | Shah | G06Q 10/087 |
| 2018/0218494 | A1 * | 8/2018 | Chaubard | G06Q 10/087 |
| 2018/0260772 | A1 * | 9/2018 | Chaubard | G06T 7/0008 |
| 2020/0005225 | A1 * | 1/2020 | Chaubard | G06Q 10/087 |
| 2020/0286032 | A1 * | 9/2020 | Bogolea | G05D 1/0282 |
| 2023/0020026 | A1 * | 1/2023 | Chakraborty | G06N 3/0464 |
| 2023/0177458 | A1 * | 6/2023 | Kim | G06Q 10/087 705/28 |
| 2023/0252766 | A1 * | 8/2023 | Jha | G06V 10/82 382/103 |
| 2023/0274226 | A1 * | 8/2023 | Patil | G06Q 10/087 705/28 |
| 2024/0371030 | A1 * | 11/2024 | Dimitrov | G06Q 10/087 |

OTHER PUBLICATIONS

Rosado, Luís, et al. “Supervised learning for Out-of-Stock detection in panoramas of retail shelves.” 2016 IEEE International Conference on Imaging Systems and Techniques (IST). IEEE, 2016. (Year: 2016).*

Achakir, Farouk, Noureddine Mohtaram, and Aurelien Escartin. “An automated AI-based solution for out-of-stock detection in retail environments.” 2023 3rd International Conference on Electrical, Computer, Communications and Mechatronics Engineering (ICECCME). IEEE, 2023. (Year: 2023).*

Majdi, Muhammad Adib, Bima Sena Bayu Dewantara, and Mochamad Mobed Bachtíar. “Product stock management using computer vision.” 2020 International Electronics Symposium (IES). IEEE, 2020. (Year: 2020).*

* cited by examiner

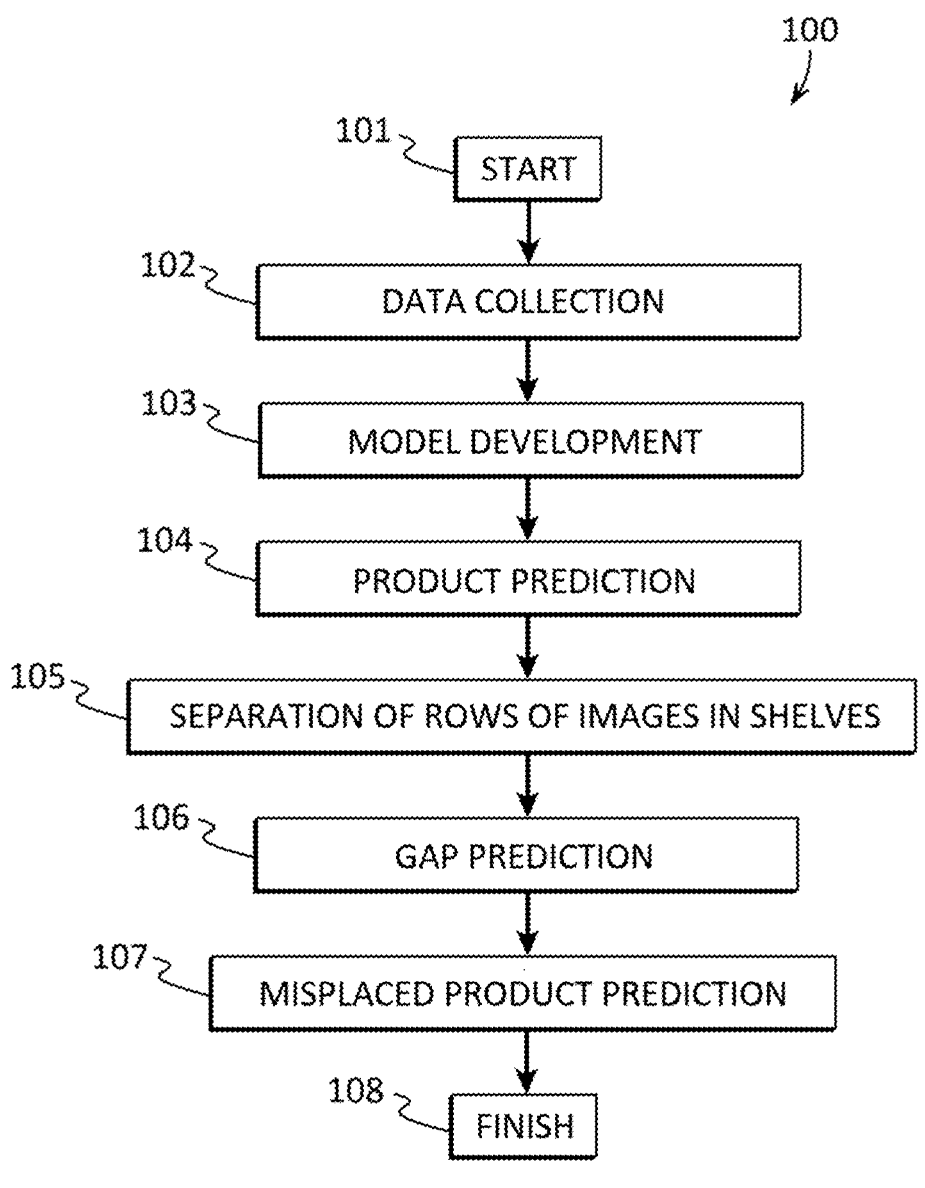
100
101
START
102
DATA COLLECTION
103
MODEL DEVELOPMENT
104
PRODUCT PREDICTION
105
SEPARATION OF ROWS OF IMAGES IN SHELVES
106
GAP PREDICTION
107
MISPLACED PRODUCT PREDICTION
108
FINISH

COMPUTER VISION AI/ML BASED SYSTEM AND METHODS FOR REAL-TIME SMART INVENTORY MANAGEMENT ON RETAIL SHELVES

CROSS REFERENCE TO RELATED APPLICATIONS

This application claims priority to and the benefit of the filing date of U.S. Provisional Application No. 63/586,069, filed on Sep. 28, 2023, entitled "Computer vision AI/ML based system and methods for real-time smart inventory management on retail shelves", which is hereby incorporated by reference in its entirety.

APPENDIX TO THE SPECIFICATION

The present application contains an appendix labeled as "Appendix-A". The entire contents of which are hereby incorporated by reference.

FIELD OF THE INVENTION

This patent specification relates to the field of automated inventory management systems and methods.

BACKGROUND

The problem retailers currently have is understanding in real-time the situation on their product shelves, the existing legacy systems and technology solutions are unable to provide the insights needed to actively manage their stock, which has resulted in pilferage, misplaced products, out-of-stock (OOS) situations in addition to other issues around manual audits with associated labor costs.

Product availability on retailer shelves has been a challenge for many businesses, this is termed as On-Shelf-availability (OSA) or conversely Out-of-Stock (OOS) in retail parlance. A global study by Harvard business review identified that: 8% of products are not available on retail shelves at any point in time as consumer walk-in to a retail store; 45% of the time consumers go for alternates or another store or change need leading to lesser customer satisfaction; 5-10% of products are lost due to pilferage/shrinkage/theft etc.; a min of 10-15 hrs./week is allotted to manual stock taking even in current times and involves labor costs that can be allocated to better consumer experience; 3-4 days for stock to replenish; and Legacy Systems do not provide real-time insights around Shelf data.

In addition, some of the challenges faced by retailers include: retail business owners have expressed that pilferage and theft of pricey products from liquor shelves has been a challenge for their business; the costs associated with manual audits of products (sometimes up to 5000+ SKUs) on shelves has been a challenge for most small and medium sized businesses; and the placement of products on shelves is called Planogram compliance and during regular store operations and doing business these products tend to get misplaced either by consumers or operation staff for one or other reasons and this needs real-time rectification.

Current solutions with Legacy technology including POS don't provide real-time actionable insights on events happening on the shelves. The challenge is the quantity of products on a typical liquor store retail outlet can be anywhere from 1000 to 5000 SKU (stock holding units or unique products) and this is laborious to manage.

Therefore, a need exists for novel automated inventory management systems and methods.

BRIEF SUMMARY OF THE INVENTION

A computer vision AI/ML based system and methods for real-time smart inventory management on retail shelves are provided. In preferred embodiments, the system may be used to address the above problems using computer vision Artificial Intelligence and Machine Learning (AI/ML) along with specific algorithms to identify products, gaps, misplaced products, planogram compliance, out-of-stock (OOS) scenarios and in addition provide the capabilities to automate the process associated with stock audits which help in reducing labor costs. The architecture of the system preferably involves positioning the high-res cameras on shelves monitoring the products 24/7/365 and wirelessly transmitting the images/picture/videos to a computing device, such as an Edge Device, having GPU and CPU capabilities which provides the inference needed for object detection, gap detection, misplaced items and out-of-stock items and preferably communicates that to the cloud and/or locally, such as for reduced latency needs, where the application and database may be hosted.

In preferred embodiments, a model used for inference may be generated externally with training data from the shelf images with products in the stores and may be validated and tested prior to preferably sending that model remotely to the edge device in the store for inference locally for reduced latency and real-time performance reasons.

With the advent of Computer Vision AI/ML, the system and methods described herein are able to effectively address these challenges and also at an optimal price point for our customers or users.

BRIEF DESCRIPTION OF THE DRAWINGS

Some embodiments of the present invention are illustrated as an example and are not limited by the figures of the accompanying drawings, in which like references may indicate similar elements and in which:

FIG. 1—FIG. 1 depicts block diagram of an example workflow process for gap and misplaced product prediction on the shelf according to various embodiments described herein.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

For purposes of description herein, the terms "upper," "lower," "left," "right," "rear," "front," "side," "vertical," "horizontal," and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first," "second," etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 20% of the specified number. Additionally, as used in this application, the term "substantially" means that the actual value is within about 10% of the actual desired value, more preferably within about 5% of the actual desired value and even more preferably within about 1% of the actual desired value of any variable, element or limit set forth herein.

A new Computer vision AI/ML based system and methods for real-time smart inventory management on retail shelves are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

The present invention will now be described by example and through referencing the appended FIGURE representing preferred and alternative embodiments.

To ease description of the system, it will be described as used with bottled products. However, it should be understood that the system may be used with any type of product, such as boxed products, bagged products, products in other containers, and products not in containers.

A computer vision AI/ML based system and methods for real-time smart inventory management on retail shelves are provided. In preferred embodiments, the system may be used to address inventory management problems using Computer Vision, Artificial Intelligence and Machine Learning (AI/ML) along with specific algorithms to identify products, gaps, misplaced products, planogram compliance, out-of-stock (OOS) scenarios and in addition provide the capabilities to automate the process associated with stock audits which help in reducing labor costs. The architecture of the system preferably involves positioning the high-res cameras on shelves and other locations (for example on walls in some instances because of aisles facing walls) monitoring the products 24/7/365 and wirelessly transmitting the images/picture/videos to a computing device, such as an Edge Device, having GPU and CPU capabilities, which provides the inference needed for object detection, gap detection, misplaced items and out-of-stock items and preferably communicates that to the cloud where the application and database are hosted.

In preferred embodiments, the model used for inference may be generated externally with training data from the shelf images with products in the stores and may be validated and tested prior to preferably sending that model remotely to the edge device in the store for inference locally for reduced latency and real-time performance reasons.

Gap detection is based on geometric calculation (based on centroid determined post detection) of distance between subsequent bottles and comparing with a set threshold Another consideration is if a bottle is missing in the prediction but was detected earlier then it is considered missing, and the gap as mentioned is calculated and compared with the threshold to determine gap and an alert is sent to the user. FIG. 7 of appendix to specification shows example calculations for the gap detection. For example, brand A was placed ahead of brand B in a row. Then brand B xmin−brand A xmax exceeds the set threshold which was calculated in the beginning (or planogram ground truth) then it is assumed there is no product at that row/column and the difference has become large and hence gap or out of stock is determined.

In some embodiments, Gap detection (partial stock) detection of partial stock levels in the shelf may be performed by tracking removal and addition of products from the shelf/shelves in real-time. This may be accomplished in several stages:

- Stage 1. First by comparing each frame from each camera and extracting region of interest (ROI) where change (product removal or addition) has occurred. For example, frames comparison for each camera: (The partial stock removal/addition is achieved in several stages:) First by comparing current camera frame with single or multiple images in time sequence for single or plural regions of interest detection (ROI) where change has occurred etc.
- Stage 2. Determining an action/change did or did not occur. For example, classify single or plurality of the ROIs in the sequence of compared images that may or may not be consecutive in time as action (change) where true change (product removal or addition has occurred or as no-action (no-change) where no true action has occurred.
- Stage 3. If change occurred, is it removal or addition using a classifier. For example, classify the sequence of ROIs that are true action (change) as either product removal or addition.
- Stage 4. Then extracting the coordinates of that ROI and matching with coordinates of product detection from FIG. 3 which shows product detection and classification to identify which product and location and communicate that to the application as notification. For example, finally match the centroids of the sequence of ROIs with the coordinates of each detected and classified products from the section 4 (above) to identify product name and location.

In some embodiments, misplaced product detection may be based on object detection and comparison algorithm with pixel coordinates (centroid) and current location.

In some embodiments, object counting in shelves preferably may be based on stereo vision system and optical characteristics enabled calculation for depth detection which enables counting of product as it is removed from shelf.

In some embodiments, communication as notification to the application part may be more general and should summarize the entire approach. In the sense that all of the Detection/classification results may be post-processed to compose a meaningful notification of missing, misplaced and out-of-stock products.

FIG. 1 illustrates a flowchart of a method for product detection and subsequently gap and misplaced product prediction that may be used by the system according to various embodiments described herein.

Data Collection and Preparation—Step 102

In some embodiments, the method may start by collecting images of the shelf, having a plurality of products positioned on the shelf, from the camera sensor. Images can be taken from multiple locations, by multiple camera sensors, and can capture shelves of any size, with any number of rows.

Data Preparation preferably involves proper annotation (labeling and contouring) of each product on the shelf along with capture of metadata (like UPC code, bar code, expected bottle positions and other specs), subsequent conversion to format that a neural network model requires and providing associated files ready to be used by the model for training. For example, the total number of unique products may be up to 350 within a 20 ft aisle and each of these has been annotated and meta data captured with software tools.

Model Development—Step 103

In some embodiments, the method may include model development that may be accomplished in two phases. Firstly, the system may use a pretrained deep learning model that can recognize common objects, such as bottles as shown in the Figures. To perfect the results, such as when used with a shelf having bottled products, the system may finetune this model for bottle detection on the dataset. The system may then finetune a second model that will take the segmented images of the detected bottles and use an image classifier to identify the bottle. In preferred embodiments, the bottle is first detected, then the image crop is sent into a second model to classify the bottle. Some additional model development for action detection and action classification (product removal or addition) from shelf may be used when a shelf is partially stocked. This preferably involves two models and may be used address partial stock status on the shelf.

In some embodiments, the method may include model development that may be accomplished in three phases. Firstly, the system may use a pretrained deep learning model that can recognize common objects, such as bottles. To perfect the results, such as when used with a shelf having bottled products, the system may finetune this model for bottle detection on the dataset. The system may then train a second model that will take the segmented images of the detected bottles and use an image classifier to identify the bottle.

Product Prediction—Step 104

In some embodiments, the method may include product prediction in which the trained model may be sent to a computing device, such as an edge device, where it is used to infer and predict which product a specific camera sensor captured. Based on step two above the products are detected and segmented. The result is the bottle name and its segmentation for each item in the shelf. The results preferably are then published/sent to cloud database and the web/mobile application consumes the data and provides the insights to the end-user through the user interface (web/mobile). The insights are both visual and quantitative, visuals include planogram (layout of products and placement on the shelf) of the shelf, identification label of each product, if misplace call out, if missing call out and ultimately the quantity of each product.

Separation of Rows of Product Images/Pics in Shelves—Step 105

In some embodiments, the method may include separation of Rows of product images/pics in Shelves. For further processing of the detections, such as gap detection and misplaced products identification, the detections are preferably separated based on the shelf's rows.

Gap Prediction/Detection for Out of Stock (OOS)—Step 106

In some embodiments, the method may include gap prediction when the product at a particular location is completely empty (removed). Gaps show up when a product is taken out of the shelf, leaving an empty space. A gap may be identified as a lack of detection from the model at a particular position on the shelf (optionally labeled as No Product Detected (NPD)). In preferred embodiments, gap detection is based on geometric calculation of distance between subsequent bottles and comparing with a set threshold. Another consideration is if a bottle is missing in the prediction but was detected earlier, then it is considered missing, and the gap as mentioned is calculated and compared with the threshold to determine gap and an alert is sent to the user.

In preferred embodiments, an innovative method/approach used in gap prediction may be to set a threshold for distance between two successive products (column) in any row (for example each row has 30 columns of unique products) based on mostly unchanging planogram. This is considered a default gap between columns of products in any specific row. If this gap increases (goes considerably beyond the threshold) because a product has been removed, then this situation is identified as a gap, and a notification is sent to the user of this application to take action to fix the gap. The threshold is based on the other detections. The algorithm adapts to the average width of each detection and uses this measure to define a threshold for gap identification. The gap notification is important because if the product is stolen and not paid for (as not recognized by POS) then it is a loss for business.

In an alternate approach, the gap for Out-of-stock may be detected when the planogram is used as the basis for location confirmation. As an example, if the planogram claims a certain location for a bottle (X, Y coordinates) whereas the real-time detections tell that the coordinates are no longer true then missing (or gaps) values bottles are planogram identified bottles (position files as ground truth) minus the detected bottles in the shelf at that point in time. This method relies on planograms being accurate at all times.

Gap Detection as (Partial Stock Status)

In some embodiments, the method may include detection of partial stock levels in the shelf by tracking removal and addition of products from the shelf/shelves in real-time. This may be accomplished in several stages, such as –1. First by comparing each frame from each camera and extracting region of interest (ROI) where change (product removal or addition) has occurred, 2. Determining an action/change did or did not occur, 3. If change occurred, is it removal or addition using a classifier, 4. Then extracting the coordinates of that ROI and matching with coordinates of product detection from Product Prediction section (above) to identify which product and location and communicate that to the application as notification.

Misplaced Product Identification—Step 107

In some embodiments, the method may include misplaced product identification that is preferably based on object detection and comparison algorithm with pixel coordinates (centroid) and current location. Clients of the store can tend to move objects around the shelf. It's important for the owner to have the bottles placed correctly, which is why we want to notify him.

In preferred embodiments, misplaced product identification method starts with noting the position of each bottle, its row and position within the shelf. For example, if row 2 has 25 bottles, and the bottle we're looking for is on position 6, the system should expect the detected bottle to be within the 5/25th and 7/25th mark of the 2nd row. When looping through each detection, the system can compare their centroid to their expected position range and call for a misplacement if the bottle is not within the expected location.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A method for product detection and subsequently gap and misplaced product prediction, the method comprising:

collecting images of a shelf, having a plurality of products positioned on the shelf, from a camera sensor;

labeling and contouring each product on the shelf in the collected images along with capture of product metadata and subsequent conversion to a format that a neural network model requires and providing associated files ready to be used by the model for training;

performing model development, to form a trained model, by using a pretrained deep learning model that can recognize objects;

performing product prediction in which the trained model is sent to a computing device where it is used to infer and predict which product the camera sensor detected, wherein performing product prediction comprises detecting and segmenting the products in the images to obtain a product identifier and segmentation for each item on the shelf that is used to generate a planogram layout of products and placement on the shelf;

separating detections based on rows of the shelf prior to performing a gap prediction;

performing the gap prediction when the product at a particular location is completely empty to detect an out-of-stock condition at a product location on a shelf; and providing a notification to a user when an out-of-stock condition at a product location on a shelf is detected.

2. The method of claim 1, wherein the product metadata comprises at least one of a UPC code, a bar code, or expected bottle positions.

3. The method of claim 1, wherein reconstructing the digital shelf representation comprises publishing results of the product prediction to a cloud database and providing, via a web or mobile user interface, the planogram layout as a visual insight.

4. The method of claim 1, wherein the planogram layout and placement of products on the shelf is presented with identification labels for each product and with quantitative information including quantities of each product.

5. The method of claim 1, wherein performing the gap prediction comprises computing a distance between successive detected products and comparing the distance to a threshold, and sending a gap notification when the distance exceeds the threshold.

6. The method of claim 5, wherein the threshold adapts based on an average width of detections to define the threshold for gap identification.

7. The method of claim 1, further comprising identifying a misplaced product based on comparing a centroid of a detected product to an expected position range within a row of the shelf, and providing a misplaced-product notification via a web or mobile user interface.

8. The method of claim 1, further comprising detecting partial stock status by tracking removal and addition of products from the shelf in real time by comparing frames to extract a region of interest, classifying whether an action occurred, classifying the action as removal or addition, and matching coordinates of the region of interest to coordinates of the product prediction to identify which product and location to notify of the partial stock status via a web or mobile user interface.

9. The method of claim 1, wherein performing product prediction comprises using the baseline digital shelf representation as ground truth for expected placement and identifying, as misplaced products, one or more detected products having centroids outside respective expected position ranges, and providing a notification identifying the misplaced products via a web or mobile user interface.

10. A method for product detection and subsequently gap and misplaced product prediction, the method comprising:

collecting images of a shelf, having a plurality of products positioned on the shelf, from a camera sensor;

labeling and contouring each product on the shelf in the collected images along with capture of product metadata and subsequent conversion to a format that a neural network model requires and providing associated files ready to be used by the model for training;

performing model development, to form a trained model, by using a pretrained deep learning model that can recognize objects;

performing product prediction in which the trained model is sent to a computing device where it is used to infer and predict which product the camera sensor detected;

collecting, by the camera sensor, a sequence of images of the shelf;

comparing a current image frame to one or more earlier image frames of the sequence of images to extract at least one region of interest (ROI) corresponding to a change on the shelf;

classifying the ROI as indicating an action in which a product removal has occurred;

determining coordinates of the ROI and matching the coordinates of the ROI with coordinates of product detections from the product prediction to identify at least one removed product and a shelf location associated with the product removal; and providing a notification, via a web or mobile user interface, identifying the at least one removed product and the shelf location.

11. The method of claim 10, wherein comparing the current image frame to the one or more earlier image frames comprises detecting the ROI using a time sequence of images that are not consecutive in time.

12. The method of claim 10, wherein classifying the ROI as indicating the action in which a product removal has occurred comprises classifying a plurality of ROIs from a plurality of compared image frames.

13. The method of claim 10, wherein determining the coordinates of the ROI comprises extracting coordinates of the ROI and matching centroids of a sequence of ROIs with coordinates of detected and classified products.

14. The method of claim 10, further comprising performing the product prediction by sending a trained model to a computing device comprising an edge device and using the trained model to infer and predict which product the camera sensor captured.

15. The method of claim 10, wherein the product prediction comprises detecting and segmenting products in the images to obtain a product identifier and segmentation for each item on the shelf.

16. The method of claim 10, further comprising separating detections based on rows of the shelf prior to matching the coordinates of the ROI with the coordinates of the product detections.

17. The method of claim 10, further comprising identifying a misplaced product based on object detection and comparing a centroid of a detected product to an expected position range for the detected product.

18. The method of claim 10, further comprising performing object counting based on a stereo vision system to determine depth information for counting products as products are removed from the shelf.

19. The method of claim 10, further comprising:

comparing the current image frame to the one or more earlier image frames of the sequence of images to extract a region of interest corresponding to a change in position of a detected product on the shelf;

determining coordinates of the region of interest and matching centroids of a sequence of the regions of interest with coordinates of detected and classified products from the product prediction to identify a product associated with the change in position; and determining that the identified product is a misplaced product when a centroid of the identified product is outside an expected position range for the identified product within a row of the shelf.

* * * * *